(12) United States Patent
Ngo

(10) Patent No.: US 10,916,220 B2
(45) Date of Patent: Feb. 9, 2021

(54) DETECTION AND DISPLAY OF MIXED 2D/3D CONTENT

(71) Applicant: Apple Inc., Cupertino, CA (US)

(72) Inventor: Long H. Ngo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/510,278

(22) Filed: Jul. 12, 2019

(65) Prior Publication Data

US 2020/0051527 A1 Feb. 13, 2020

Related U.S. Application Data

(60) Provisional application No. 62/715,331, filed on Aug. 7, 2018.

(51) Int. Cl.
*G09G 5/12* (2006.01)
*G06F 3/14* (2006.01)

(52) U.S. Cl.
CPC ............. *G09G 5/12* (2013.01); *G06F 3/1423* (2013.01); *G09G 2354/00* (2013.01)

(58) Field of Classification Search
None
See application file for complete search history.

(56) References Cited

U.S. PATENT DOCUMENTS

| | | |
|---|---|---|
| 9,038,127 B2 | 5/2015 | Hastings et al. |
| 9,059,942 B2 | 6/2015 | Boldyrev et al. |
| 9,277,283 B2 | 3/2016 | Cho et al. |
| 2017/0323488 A1* | 11/2017 | Mott ................. G06F 3/002 |
| 2018/0114372 A1 | 4/2018 | Nagy et al. |
| 2018/0144556 A1 | 5/2018 | Champion et al. |

FOREIGN PATENT DOCUMENTS

| | | |
|---|---|---|
| EP | 1720131 A1 | 11/2006 |
| JP | 2011-258120 A | 12/2011 |
| JP | 2013-520743 A | 6/2013 |
| JP | 2014-011654 A | 1/2014 |
| WO | 2018/009427 A1 | 1/2018 |
| WO | WO2018009427 A1 * | 1/2018 ............. G06T 15/20 |

OTHER PUBLICATIONS

European Patent Office, Extended European Search Report and Search Opinion, European Patent Application No. 19186552.6, 7 pages, dated Jan. 7, 2020.
Korean Intellectual Property Office, Notice of Preliminary Rejection (with English translation), Korean Patent Application No. 10-2019-0092327, 8 pages, dated Jul. 2, 2020.
Japanese Patent Office, Notification for Reason(s) for Rejection (with English translation), Japanese Patent Application No. 2019-144452, 10 pages. (dated Sep. 3, 2020).

* cited by examiner

*Primary Examiner* — Christopher J Kohlman
(74) *Attorney, Agent, or Firm* — Thompson Hine LLP

(57) ABSTRACT

Various implementations disclosed herein include devices, systems, and methods that enable a first device to obtain two-dimensional (2D) content referenced by a webpage and a second device in communication with the first device to display 3D content referenced by the webpage. In an example, it is detected that the webpage references 3D content associated with 2D content and detected that a second device, capable of displaying the 3D content referenced by the webpage, is linked to or in communication with the first device. In one example, the second device receives input corresponding to a user selection to view the 3D content, and in response, displays an 3D environment including the 3D content.

20 Claims, 10 Drawing Sheets

DETECTION AND DISPLAY OF MIXED 2D/3D CONTENT

CROSS-REFERENCE TO RELATED APPLICATION

This application claims the benefit of U.S. Provisional Application Ser. No. 62/715,331 filed Aug. 7, 2018, which is incorporated herein in its entirety.

TECHNICAL FIELD

The present disclosure generally relates to displaying two dimensional (2D) and three dimensional (3D) content, and in particular, to systems, methods, and devices for sharing and displaying 2D and 3D content.

BACKGROUND

Electronic devices have different capabilities with respect to viewing and interacting with electronic content. For example, many desktops and laptops utilize single flat screen displays that are generally well suited for viewing 2D content while the devices are resting in fixed positions on desks and other flat surfaces. Traditional webpages include 2D content that is easily viewed on such devices. Such devices, however, have limitations with respect to viewing 3D content. In contrast, mobile devices, head-mounted devices (HMDs), and other such devices often have attributes and features that can make them better suited for viewing 3D content. For example, 3D content (e.g., virtual objects) can be viewed on a mobile phone and the orientation/position of the mobile phone can be used to change the view of the 3D content. As the user walks around and tilts the phone, he or she can view the 3D content from different relative positions and angles. As another example, some devices, such as HMDs, include multiple screens that provide the ability for stereoscopic rendering of 3D content. This can allow a user to better perceive depth when viewing 3D content. Existing techniques and systems do not adequately facilitate the distribution, viewing, and sharing of 2D and 3D content to enable the effective and intuitive use of the differing capabilities of these electronic devices.

SUMMARY

Various implementations disclosed herein include devices, systems, and methods that enable a first device to display 2D content referenced by a content item (e.g., a webpage) and a second device in communication with the first device to display 3D content referenced by the content item. In an example, a first device displays the 2D content of a webpage. The first device or a second device detects that the webpage references 3D content associated with that 2D content. The second device is capable of displaying the 3D content referenced by the webpage and is linked to or otherwise in communication with the first device. The first or second device determines that the second device should display the 3D content. The determination to display the 3D content on the second device can be based on detecting that the devices are in communication with one another, detecting that the devices are located proximate one another, detecting that the first device is within an image captured by the second device, detecting user input, or detecting other relevant circumstances or information. After determining that the second device should display the 3D content, the second device receives the 3D content referenced by the webpage from the first device or from another webpage source and displays the 3D content. In one example, the first device previously downloaded the 3D content as part of the webpage content and automatically sends the 3D content to the second device for display. In another example, the second device request the 3D content from the first device or from the web server that hosts the webpage or its 3D content.

After receiving the 3D content, the second device, in various implementations, displays the 3D content. Displaying the 3D content may utilize one or more features to display the 3D content that are not available on the first device. For example, the second device may display the 3D content from a user/device-position-based viewpoint (e.g., changing as the device is moved and titled), using stereoscopic rendering, or in a computer generated reality (CGR) environment. The second device may display the 3D content using one or more of these viewing modes or otherwise in a way that is not available on the first device. In some implementations, the second device uses a camera to capture images and constructs a CGR environment using the 3D content and the captured images.

In some implementations, the user of the second device is able to simply and easily receive, view, and use the 3D content without necessarily needing to move the 3D content to a particular storage location on the second device, identify that the 3D content can be experienced on the second device, identify an app to experience the 3D content, launch such an app, or import or add the received 3D content to a CGR environment provided by such an app. The user's experience of using two or more devices to experience the 2D and 3D content of a website is efficient and intuitive.

Devices, systems, and methods disclosed herein enable the display of 3D content that corresponds to 2D webpage content viewed on a first device. The devices, systems, and methods improve the ability of users to use, share, and interact with 2D content that is combined with 3D content. For example, a first user, who is using a first device, can view a webpage including 2D content corresponding to a couch being sold from an online retailer. The webpage can include a 3D content indicator such as a markup language statement that indicates the availability of 3D content that is part of the webpage, for example, corresponding to 2D image of the couch in the 2D content. The 2D content can include a graphical indicator indicating that this 3D content is available. The first user or a second user may then use a second device to view the 3D content. In the couch example, the second device is used to access the 3D content corresponding to the couch, e.g., accessing a data object or file that includes a 3D model of the couch or identifying a file or data storage address of a file that includes a 3D model of the couch. In one example, the first device sends a communication to the second device that includes or provides access to the 3D content.

Based on receiving the communication from the first device, the second device enables viewing or use of the 3D content. In one example, the second device receives input corresponding to a user selection to view the 3D content in a CGR environment. Responsive to detecting this input, the second device displays the 3D content as part of a CGR environment. Such a CGR environment can be provided by using the camera to capture images (e.g., video) and constructing the CGR environment using the 3D content and the captured images. In some implementations, the second device overlays the 3D content on the captured images.

In some implementations, a method is performed at a first device having one or more processors and a computer-readable storage medium, such as a desktop, laptop, tablet, etc. The method involves obtaining, by the first device, 2D content referenced by a webpage that also references 3D content. The method also involves a second device that is capable of presenting the 3D content (e.g., capable of providing a view from user/device-position-based viewpoint, using stereoscopic rendering, or in a CGR environment), such as a tablet, HMD, mobile phone, etc. The second device receives and presents the 3D content referenced by the webpage. The method may include detecting that the webpage references 3D content that cannot be displayed by the first device or detecting any other circumstance that will trigger an automatic communication between the first and second device or result in the automatic display of the 3D content on the second device.

Some implementations, as illustrated in the above example and elsewhere herein, thus enable viewing 2D content referenced by a webpage on a first device and 3D content referenced by the webpage on a second device. These implementations provide an improved user viewing experience. For example, a single user having two devices (e.g., a laptop and an HMD) can browse webpages and, when a webpage references 3D content of interest, put on the HMD and automatically, or via an intuitive user experience, access and view that 3D content. In another example, multiple users are able to experience the 2D and 3D content referenced by a webpage in a similarly convenient sharing experience. For example, one user may view a webpage that shows a car on a laptop while the other user uses an HMD to experience 3D content of the website relating to the car.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
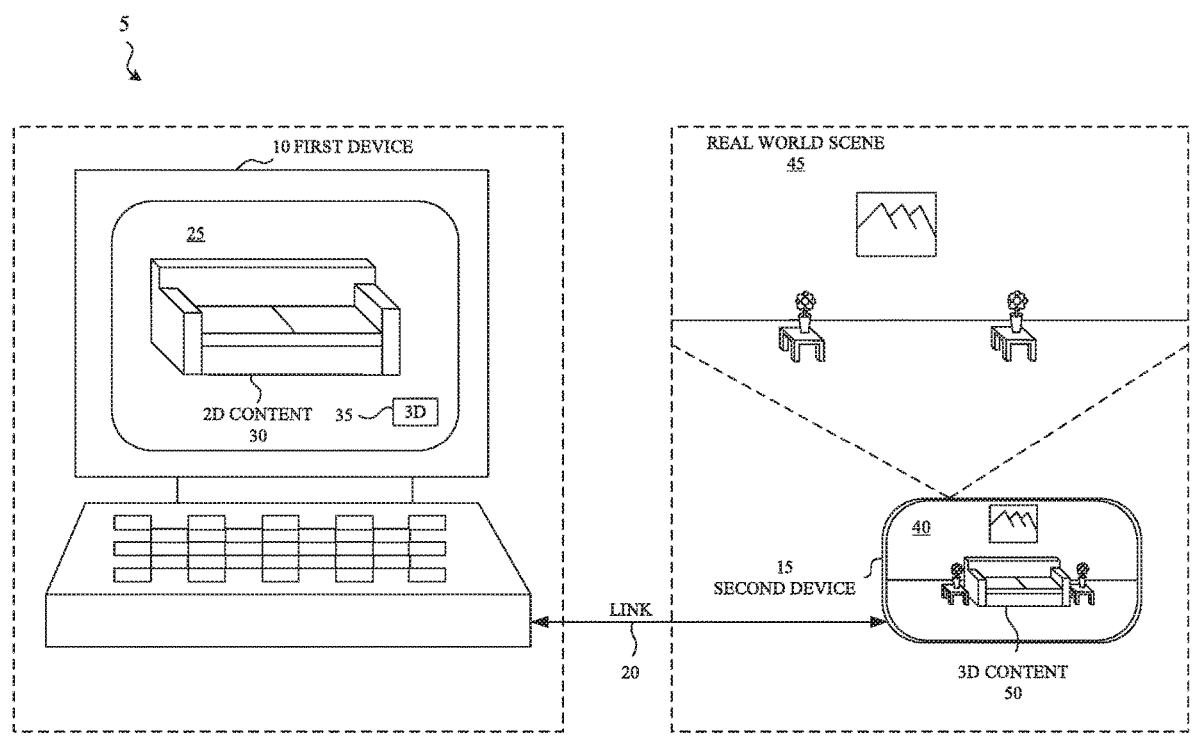
FIG. 1 illustrates an example system in which a first device displays 2D content referenced by a webpage that also references 3D content and a second device displays the 3D content in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Referring to FIG. 1, an example operating environment 5 for implementing aspects of the present invention is illustrated. In general, operating environment 5 represents two devices, first device 10 and second device 15 involved in experiencing a content item (e.g., a webpage) that references 2D and 3D content. While the examples herein utilize a webpage as an exemplary content item, the techniques disclosed herein apply to any content item that references 2D and 3D content that may be viewed by applications one or more devices.

In this example, first device 10 and second device 15 are linked via link 20, e.g., a wired or wireless link including, but not limited to, wired communications such as those that use a Universal Serial Bus (USB) cable/interface, a USB-C cable/interface, a THUNDERBOLT v1, v2, or v3 cable/interface, an IEEE 1394 cable/interface (e.g., FIREWIRE, i.LINK, LYNX), an IEEE 802.3x cable/interface (e.g., Ethernet), etc., and wireless communications such as those that use IEEE 803.11 transmissions (e.g., WiFi), IEEE 802.11 transmissions (e.g., WLAN), IEEE 802.16x transmissions (e.g., WiMAX), short-wavelength transmission (e.g., BLUETOOTH), IEEE 802.15.4 transmissions (e.g., ZIGBEE), GSM transmissions, ECMA-340 and ISO/IEC 18092 (e.g., near-field communication (NFC)), etc. The link 20 can be direct, i.e., without an intervening device or network node between the first device 10 and second device 15. For example, the link 20 can involve directly connecting first device 10 to second device 15 via a single cable that plugs into each device or via Bluetooth communications between first device 10 and second device 15. The link 20 can be indirect, i.e., with one or more intervening devices or networks nodes. For example, the link 20 can connect first device 10 to second device 15 via communications sent via the Internet. Furthermore, interaction between devices, e.g., first device 10 and second device 15, can be bi-directional, e.g., one device can send a communication to the other device to perform an action relative to the webpage.

In the example of FIG. 1, the first device 10 obtains webpage content 25 (e.g., on a web browser), including 2D content 30 (e.g., image of a couch) and an indicator 35 of 3D content 50 associated with the 2D content 30. For example, the 3D content 50 may include a 3D model of the couch. The 3D content 50 is observed on the second device 15 in a CGR environment. For example, second device 15 may use a camera to capture the nearby environment, e.g., a real world scene 45 including end tables and a wall picture and display the captured scenery with a 3D model of the couch.

The devices, systems, and methods enable the user to see an indicator 35 that associated 3D content 50 is available and send the 3D content 50, e.g., 3D content representing the couch, to the second device 15. A user of the second device 15 (e.g. the same or a different user as the user of the first device 10) may then experience the 3D content 50 on the display 40 of the second device 15. In this example, the 3D content 50 is displayed as part of a CGR environment.

A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some CGR environments, computer-generated sensory inputs may respond to changes in sensory inputs from the physical environment. Also, some electronic systems for presenting an CGR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In the example of FIG. 1, the CGR environment combines the real world (e.g., via locally captured images of the real world scene 45) and the 3D content 50 (e.g., a file or model defining a 3D appearance of a couch).

In this example the second device 15 has received the data object corresponding to 3D content 50 (e.g., couch of FIG. 1). The webpage content 25 obtained by the first device 10 may include an indicator 35 (e.g., a thumbnail image, icon, link, or button) representing or corresponding to the 3D content 50. In the case of an icon or thumbnail image, for example, the icon or thumbnail image may include a 2D image of the content of the 3D object from a single or standard viewpoint. Thumbnail images, icons, links, and buttons are examples of graphical features that can indicate additional 3D content is available. Additionally, or alternatively, a graphical indicator of available 3D content may be configured to receive input (e.g., clicks, touches, etc.) corresponding to a user selection to view the 3D content 50 on the display 40 of the second device 15. For example, the first device 10 could receive input selecting to display the 3D content 50 (e.g. the couch) on the display 40 of the second device 15 by receiving a mouse click on the indicator 35 (e.g., a thumbnail image corresponding to the 3D content 50).

The second device 15 controls one or more cameras on the second device 15 to capture images of the real world scene 45 and displays CGR content on the display 40 of the second device 15 using the 3D content 50 and the captured images. In some implementations, the second device 15 includes a suitable combination of software, firmware, or hardware to provide a CGR environment. In other implementations, the second device 15 interacts with one or more other devices (local or remote) to provide a CGR environment on the display 40 of the second device 15, e.g., the second device 15 may communicate with a separate controller device (not shown) that performs some or all of the processing and storage required to provide a CGR environment. According to some implementations, the second device 15 displays a CGR environment based on real world scene 45 while the second device 15 is physically present within the real world scene 45. In some implementations, the second device 15 (e.g., glasses, heads up display, so forth) is configured to provide a CGR environment on the display 40 of the second device 15 using optical see-through of the real world scene 45. In some implementations, the second device 15 is configured to provide a CGR environment on the display 40 of the second device 15 using video pass-through of the real world scene 45. In some implementations, second device 15 need not have a display screen and can project virtual elements into a user's retinas.

In some implementations, as illustrated in FIG. 1, the second device 15 is a handheld electronic device (e.g., a smartphone or a tablet) configured to display a CGR environment on the display 40 of the second device 15. In some implementations, the second device 15 is a chamber, enclosure, or room configured to present a CGR environment in which a user does not wear or hold the second device 15. In some implementations, it may be detected that the second device 15 is capable of displaying the 3D content 50 by detecting a type of the second device 15, i.e., by identifying that the type of the second device 15 is a type of device capable of displaying 3D content 50. Furthermore, it may be detected that the second device 15 is capable of displaying the 3D content 50 by detecting an application stored on second device 15 capable of displaying 3D content 50.

In the example of FIG. 1, the second device 15 is configured to use images or other real world information detected based on a camera or other sensor on the second device 15. In some implementations, to provide a CGR environment on the display 40 of the second device 15, the second device 15 uses at least a portion of one or more camera images captured by a camera. In the example of FIG. 1, the display 40 of the second device 15 includes depictions of items captured (e.g., a floor, a wall, a wall picture, two end tables, and two vases) by a camera of the second device 15. The display 40 of the second device 15 also depicts 3D content 50 (e.g. a couch) corresponding to the 2D content 30 displayed on the first device 10.

In some implementations, the second device 15 enables the user 55 to change the viewpoint or otherwise modify or interact with 3D content 50. For example, the viewpoint may change as the user moves the second device 15. In some implementations, a second device 15 may be configured to receive user input that repositions received the 3D content 50 relative to real world item depictions of the real world scene 45 (e.g. repositioning the couch relative to the wall picture or end tables) depicted on the display 40 of the second device 15.

In some implementations, the first device 10 receives or stores the 3D content 50 corresponding to the couch that will be provided to the second device 15. In some implementations, the first device 10 then provides the 3D content 50 to the second device 15 so that the second device 15 can display the 3D content 50. In other implementations, the first device 10 does not receive or store the 3D content 50 and the second device 15 retrieves the 3D content 50 from another source such as a web server from which the webpage is served.

In some implementations, multiple devices are capable of identifying the 3D content in the same or different viewing modes. In one example, the first device 10 provides a 2D viewing mode that does not include the 3D content 50, a second device 15 provides a MR viewing mode of the 3D content 50 combined with real world content, and a third device [not shown] provides a VR viewing mode of the 3D content 50. In another example, both of the first device 10 and second device 15 are capable of providing an MR view of the 3D content 50. In one example, second device 15 displays a view of the 3D content 50 that includes different real world content depending upon the real world content surrounding or otherwise observed by the respective device. One or both of the first device 10 and second device 15 may be configured to use received data or images or other real world information detected using its own camera or other sensor. In some implementations, to provide an MR viewing mode, the second device 15 uses at least a portion of one or more camera images captured by a camera on the first device 10. In this example, the second device 15 provides a view using the real world information of the real world surrounding the first device 10.

Figure 2:
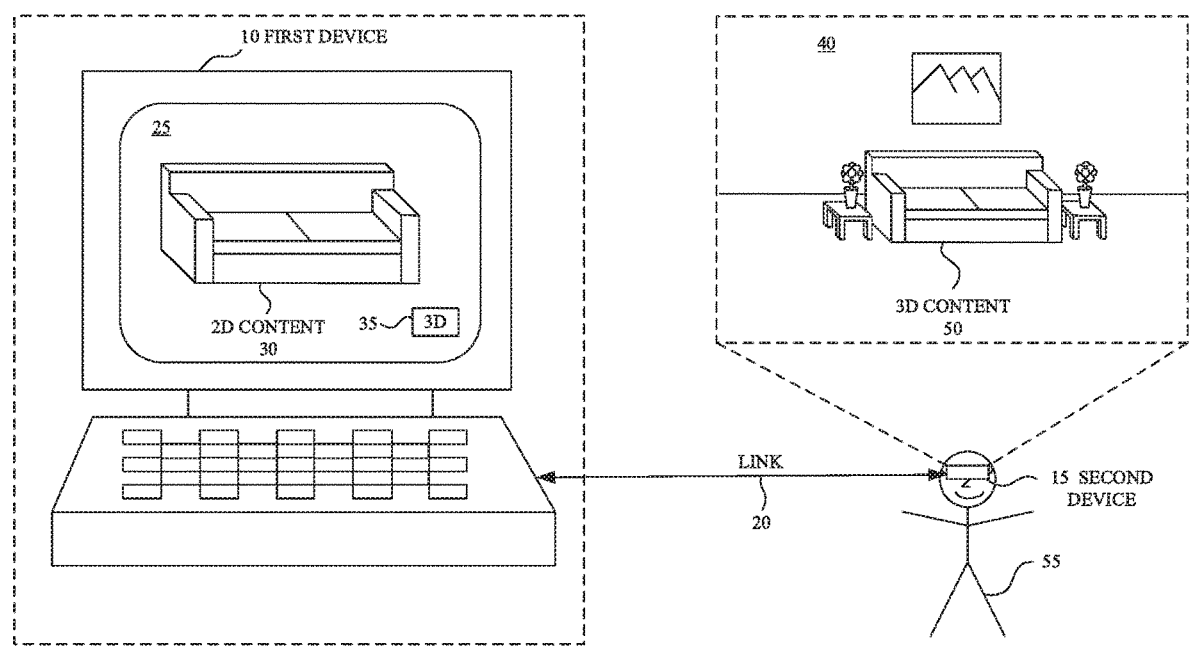
FIG. 2 illustrates the system of FIG. 1 in which the second device is an HMD in accordance with some implementations.

In some implementations, as illustrated in FIG. 2, the second device 15 is an HMD configured to be worn on the head of a user 55. Such an HMD may enclose the field-of-view of the user 55. As shown in the example of FIG. 2, an HMD can include one or more screens or other displays configured to display 3D content in a field-of-view of the user 55. As illustrated in FIG. 2, in some implementations the second device 15 is worn is a way that a screen is positioned to display 3D content in a field-of-view of the user 55. Furthermore, an HMD can include a housing (or enclosure) that houses various components. The housing can include (or be coupled to) an eye pad disposed at a proximal (to the user 55) end of the housing. In some implementations, the eye pad is a plastic or rubber piece that comfortably and snugly keeps the HMD in the proper position on the face of the user 55 (e.g., surrounding the eye of the user 55). The housing can house a display that displays an image, emitting light towards one or both of the eyes of the user 55.

Figure 3:
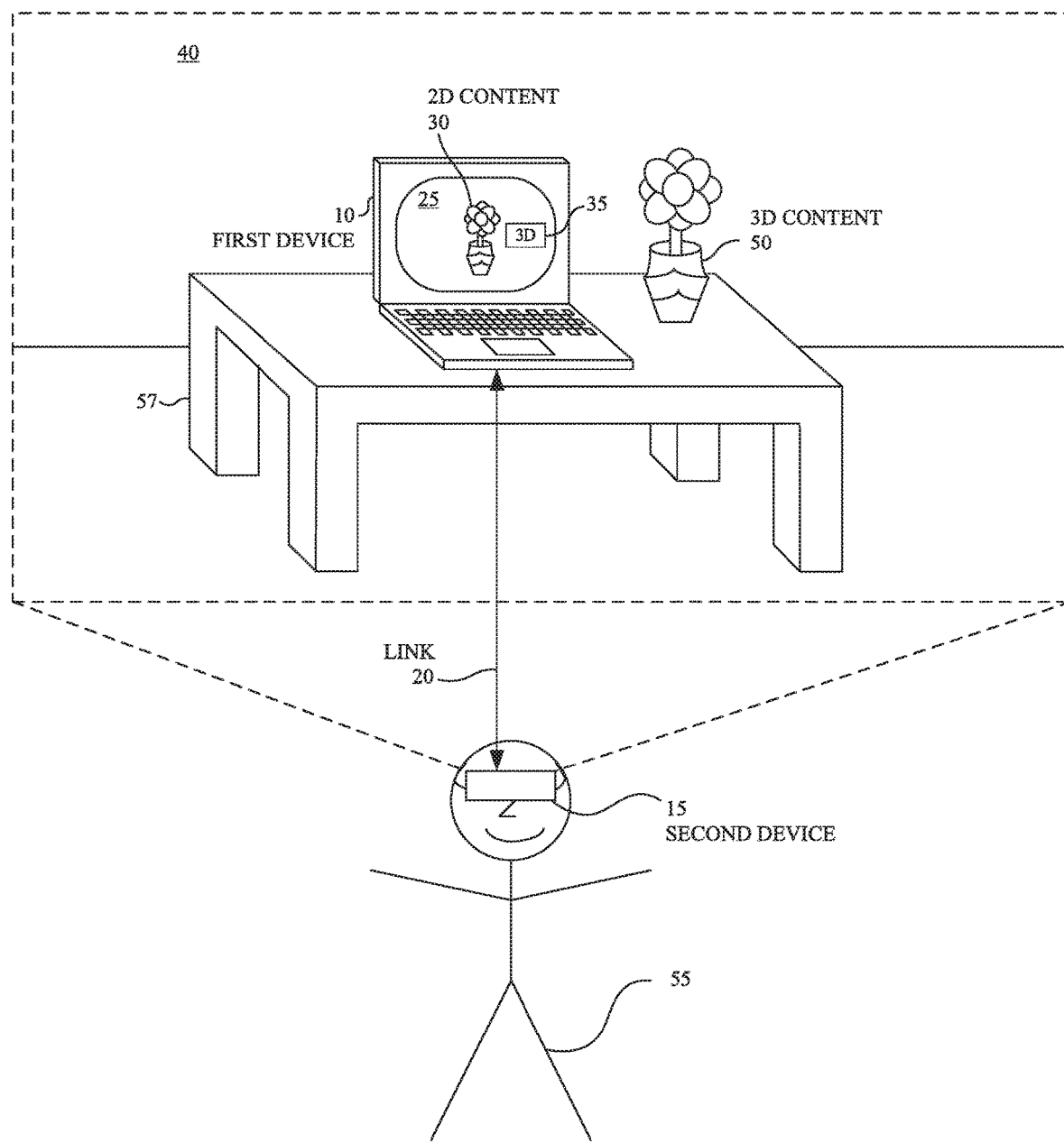
FIG. 3 illustrates an example system in which a first device displays 2D content including 3D content and a second device displays the 3D content in accordance with some implementations.

FIG. 3 illustrates an example system in which a first device 10 displays 2D content from a webpage that also references 3D content and a second device 15 displays the 3D content in accordance with some implementations. As illustrated in FIG. 3, the user 55 may wear the second device 15, e.g., HMD, as he or she uses the first device 10 to browse the Internet, e.g., using both devices 10, 15 at the same time. For example, the user 55 may wear the second device 15 while using the first device 10 to view the webpage content 25, including the 2D content 30 (e.g., flowerpot) and an indicator 35 of 3D content 50 associated with the 2D content 30. The indicator 35 may be a visible portion of the 2D content 30 displayed on the first device 10 and thus viewable as part of the image captured and displayed by the second device 15. Alternatively, the indicator 35 may be displayed only on the second device 15 without being included in the 2D content 30 on the first device 10. In one example, the indicator 35 is displayed on the second device 15 based on the second device 15 detecting the first device 10 within an image captured by the second device 15.

In some implementations, the second device 15 is configured to detect other devices depicted within its captured images, determine whether such devices are in communication with it (e.g., linked), establish a communication (e.g., link) with the other devices, identify whether any of the other devices are displaying 2D content associated with 3D content, retrieve that 3D content, and display that 3D content.

Various techniques can be used for the second device 15 to detect the presence of the first device 10 in an image or view. For example, the second device 15 may detect that the first device 10 is in the current image/view of the second device 15. Such detection can involve detecting a depiction of the first device 10 based on shape, color, or other attributes exhibited in pixels of an image or view of the real world environment at the second device 15. An object detection technique, for example, can involve use of a neural network or other machine learning-based technique to detect the first device 10 in an image captured of the real world environment around the second device 15. Such a machine-learning-based technique may have been trained using sample images of devices (e.g., trained using images labelled with shapes and other spatial characteristics of laptops, desktop, and mobile devices). In another example, the second device 15 determines a 3D model of the real world environment using images of that environment and the 3D shape of the first device 10 is detected in the 3D model.

The detection of the first device 10 in an image/view at the second device 15 can involve content displayed on a display of the first device 10. For example, the first device 10 may display the 2D content of the webpage on its display and the second device 15 may capture an image of the real world environment including the first device 10 and may recognize the 2D content of the webpage displayed on the display of the first device 10. In one example, the display of the first device 10 includes a text-based or graphical based marker or code (which may or may not be part of the 2D content of the webpage) that is used by the second device 15 to detect the presence or spatial relationship of the first device 10 in an image/view of the real world environment.

In some implementations, the second device 15 detects a spatial relationship between the first device 10 and second device 15, for example, based in images/views of the real world environment. In some implementations, the second device 15 determines a location, orientation, size, or other attributes of the first device 10 in a 3D coordinate system associated with the real world environment. The second device 15 knows its own pose (e.g., location and orientation) in that 3D coordinate system and can thus determine the spatial relationship between the first device 10 and the second device 10. In some implementations, the first device 10 and second device 20 each include sensors that allow each device to track its own changes in position and orientation over time. Thus, once an initial spatial relationship between the devices is determined (e.g., based on image data), changes to the spatial relationship can be determined based additional image-based determinations, the devices tracking their own position/orientation changes, or a combination of such tracking techniques.

In some implementations, the spatial relationship between the first device 10 and the second device 15 is used to present 3D content at the second device 15. In an example in which the first device is a laptop and the second device is an HMD, the relative location, orientation, size, or other attributes of the laptop to those of the HMD are used in presenting the 3D content on the HMD. As a specific example, the display of the 3D content on the HMD may depend on the spatial relationship (e.g., the 3D content may only be displayed when the laptop is the current image/view or within a particular threshold distance of the HMD, etc.).

In some implementations, the second device 15 captures images of the real world environment around the second device 15, including the first device 10 and its display of the 3D content of a webpage. The second device 15 displays these images with additional 3D content of the webpage added at locations, orientations, sizes, and having other attributes to supplement the 2D content that is on the display of the first device 10 and thus visible in the images captured and displayed by the second device 15.

In one example, based on the location, size, or other attributes of the first device 10, the second device 15 determines a location, size, or other attributes for displaying the 3D content via the second device 15. For example, the second device 15 may determine to display the 3D content in a manner that does not block the line of sight of the user 55 so that the user 55 maintains an unobstructed view of the display of the first device 10. The second device 15 may determine to display the 3D content at a location adjacent to the first device 10 so that the user is easily able to appreciate a contextual relationship between 2D content displayed at the first device 10 and nearby 3D content displayed by the second device 15. The second device 15 may determine to display the 3D content in way that the size of the 3D content corresponds to the size of 2D content displayed at the first device 10, e.g., so that text in the 2D and 3D content will have the same size. The second device 15 may determine to display graphical indicators connecting or otherwise graphically associating 2D content displayed at the first device 10 with 3D content displayed via the second device 15.

In another example, the second device 15 detects a pose (e.g., position and orientation) of the first device 10 in one or more images captured by the second device 15 and uses this information to display the 3D content. For example, an orientation of a plane of the display (e.g., monitor) of the first device 10 may be detected and this plane used to position 3D content in alignment with the displayed 2D content.

In some implementations, the second device 15 is configured to detect or identify a change in location of the first device 10 relative to the second device 15 and determine a second spatial relationship between the first device 10 and the second device 15. The second device 15 may then update the display of the 3D content based on the second spatial relationship. For example, if the user 55 shifts the position of the first device 10 relative to the second device 15, the second device 15 may alter the display of the 3D content so that the user maintains an unobstructed view of the display of the first device 10.

In some implementations, the second device 15 automatically retrieves and displays the 3D content 50 without requiring user input. For example, second device 15 displays 3D content 50 upon detecting that second device 15 is worn by user 55 and that second device 15 is within a threshold distance from first device 10. In other implementations, the second device 15 provides an indication that 3D content associated with 2D content on another device is available and receives input to initiate retrieval and display of that 3D content.

The second device 15 may be configured to determine display characteristics for displaying the 3D content. In some implementations, the second device determines a location to display the 3D content 50 relative to other displayed content, e.g., relative to real world content or other virtual objects, based on predetermined or user-specified display criteria. In one example, based on an awareness of the spatial relationship between the first device 10 and the second device 15, the 3D content 50 is displayed to the user 55 on the second device (e.g., HMD) within the field of vision of the user 55. In some implementations, the second device 15 determines a location to display the 3D content 50 by identifying a location at which the virtual content can be displayed without blocking the view of the webpage content 25 displayed on the first device 10. For example, as illustrated in FIG. 3 the 3D content 50 is displayed on the table 57 beside the first device 10, without blocking the view of the first device 10.

In some implementations, changes made to 3D content 50, for example in the case of an interactive webpage, via a user interface of the first device 10 or a user interface of the second device 15 are maintained or otherwise synchronized on both the first device 10 and second device 15. For example, a user of the first device 10 or the second device 15 may change the color of the couch on either the first device 10 or second device 15 and the change may be detected and displayed on the other device. A state of the webpage maintained on either of the first device 10 or second device 15 may be shared between the devices 10, 15 so that the devices 10, 15 maintain the same state and synchronization, e.g., display the same instance of the webpage. As examples, an item highlighted on the first device 10 based on a user interaction will also be highlighted on the second device 15, a change to 3D content 50 will result in a corresponding change to 2D content 30, and vice versa, etc.

Figure 4:
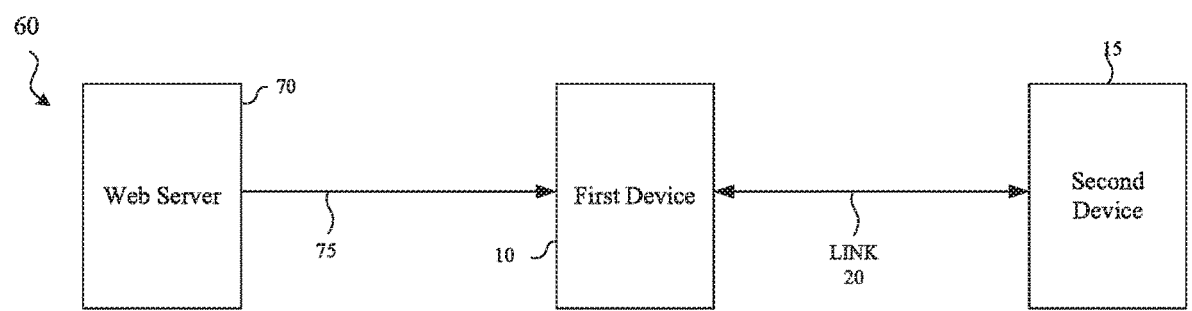
FIG. 4 is a flowchart illustrating a flow of communications involved in sharing 3D content according to some implementations.

FIG. 4 is a flowchart illustrating a flow of communications 60 involved in sharing 3D content 50 according to some implementations. In FIG. 4, a web server 70 provides a transmission 75 of a webpage including 2D content 30 and 3D content 50 to the first device 10. The first device 10 communicates via link 20 with the second device 15 and the second device 15 receives the 3D content 50. In some implementations, the first device 10 identifies which 3D content 50 to provide based on information associated with the second device 15. For example, the second device 15 may be a phone, tablet, or HMD and the 3D content 50 may be provided in an appropriate form for viewing on such a device based on the 3D content viewing features available on such a device.

Examples of objects that may be depicted in 2D and 3D content include, but are not limited to, a table, a floor, a wall, a desk, a book, a body of water, a mountain, a field, a vehicle, a counter, a human face, a human hand, human hair, another human body part, an entire human body, an animal or other living organism, clothing, a sheet of paper, a magazine, a book, a vehicle, a machine or other man-made object, and any other 3D item or group of items that can be identified and represented. 2D and 3D content can additionally or alternatively include created content that may or may not correspond to real world content including, but not limited to, aliens, wizards, spaceships, unicorns, and computer-generated graphics and other such items.

Figure 5:
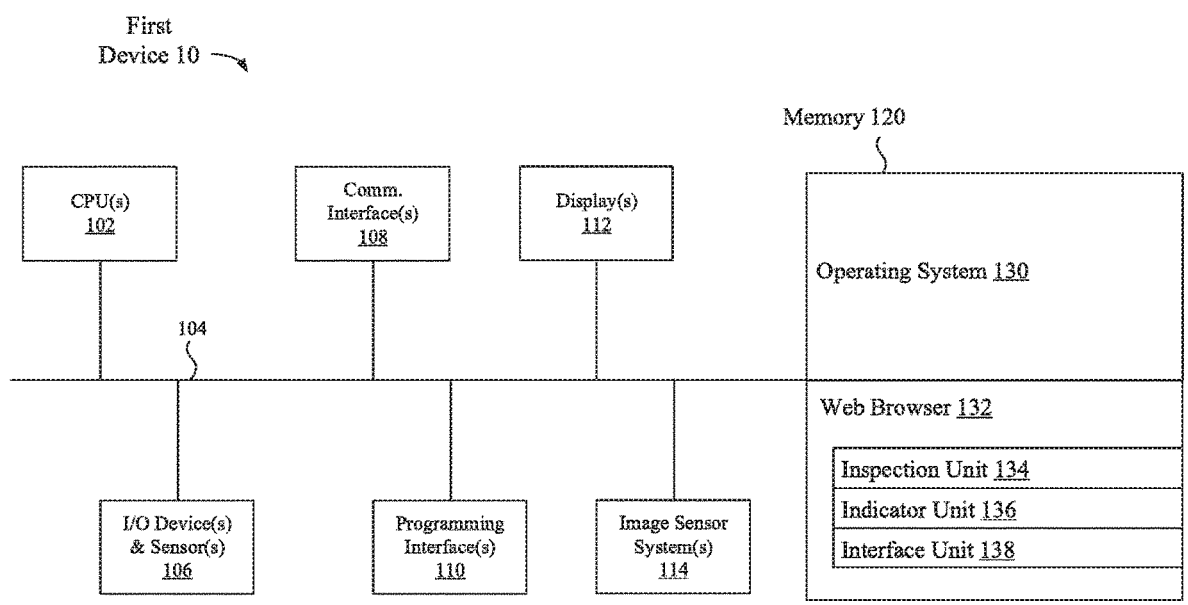
FIG. 5 is a block diagram illustrating device components of an exemplary first device according to some implementations.

FIG. 5 is a block diagram illustrating device components of first device 10 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the first device 10 includes one or more processing units 102 (e.g., microprocessors, ASICs, FPGAs, GPUs, CPUs, processing cores, or the like), one or more input/output (I/O) devices and sensors 106, one or more communication interfaces 108 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 110, one or more displays 112, one or more interior or exterior facing image sensor systems 114, a memory 120, and one or more communication buses 104 for interconnecting these and various other components.

In some implementations, the one or more communication buses 104 include circuitry that interconnects and controls communications between system components. In some implementations, the one or more I/O devices and sensors 106 include at least one of a touch screen, a softkey, a keyboard, a virtual keyboard, a button, a knob, a joystick, a switch, a dial, an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like. In some implementations, movement, rotation, or position of the first device 10 detected by the one or more I/O devices and sensors 106 provides input to the first device 10.

In some implementations, the one or more displays 112 are configured to present a user interface. In some implementations, the one or more displays 112 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 112 correspond to diffractive, reflective, polarized, holographic, etc. waveguide displays. In one example, the first device 10 includes a single display. In another example, the first device 10 includes a display for each eye. In some implementations, the one or more displays 112 are capable of presenting MR or VR content.

In some implementations, the one or more image sensor systems 114 are configured to obtain image data that corresponds to at least a portion of a scene local to the first device 10. The one or more image sensor systems 114 can include one or more RGB cameras (e.g., with a complimentary metal-oxide-semiconductor (CMOS) image sensor or a charge-coupled device (CCD) image sensor), monochrome camera, IR camera, event-based camera, or the like. In various implementations, the one or more image sensor systems 114 further include illumination sources that emit light, such as a flash.

The memory 120 includes high-speed random-access memory, such as DRAM, SRAM, DDR RAM, or other random-access solid-state memory devices. In some implementations, the memory 120 includes non-volatile memory, such as one or more magnetic disk storage devices, optical disk storage devices, flash memory devices, or other non-volatile solid-state storage devices. The memory 120 optionally includes one or more storage devices remotely located from the one or more processing units 102. The memory 120 comprises a non-transitory computer readable storage medium. In some implementations, the memory 120 or the non-transitory computer readable storage medium of the memory 120 stores the following programs, modules and data structures, or a subset thereof including an optional operating system 130 and a Web Browser 132. The operating system 130 includes procedures for handling various basic system services and for performing hardware dependent tasks. Furthermore, in some implementations, the functionality of the operating system 130 can alternatively reside in a browser, a browser plugin, or separate from the browser.

In some implementations, the operating system 130 includes a Web Browser 132 for receiving or displaying webpage content. Moreover, an inspection Unit 134 may be used by the web browser 132 for inspecting markup language or other webpage content for tags or other indications that 3D content is available. In some implementations, the operating system 130 includes an Indicator Unit 136 for adding an indicator to displayed content to indicate the existence of 3D content. Furthermore, the operating system 130 may include an Interface Unit 138 for communicating with the second device 15, including the transfer of 3D content or exchanging other information. In some implementations, one or more of the Inspection Unit 134, the Indicator Unit 136, and the Interface Unit 138 can be a part of or separate from the Web Browser 132. In some implementations, one or more of the Inspection Unit 134, the Indicator Unit 136, and the Interface Unit 138 are provided as part of an application separate from the operating system 130 or are implemented on a separate device that is local to or remote from the first device 10.

FIG. 5 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 6:
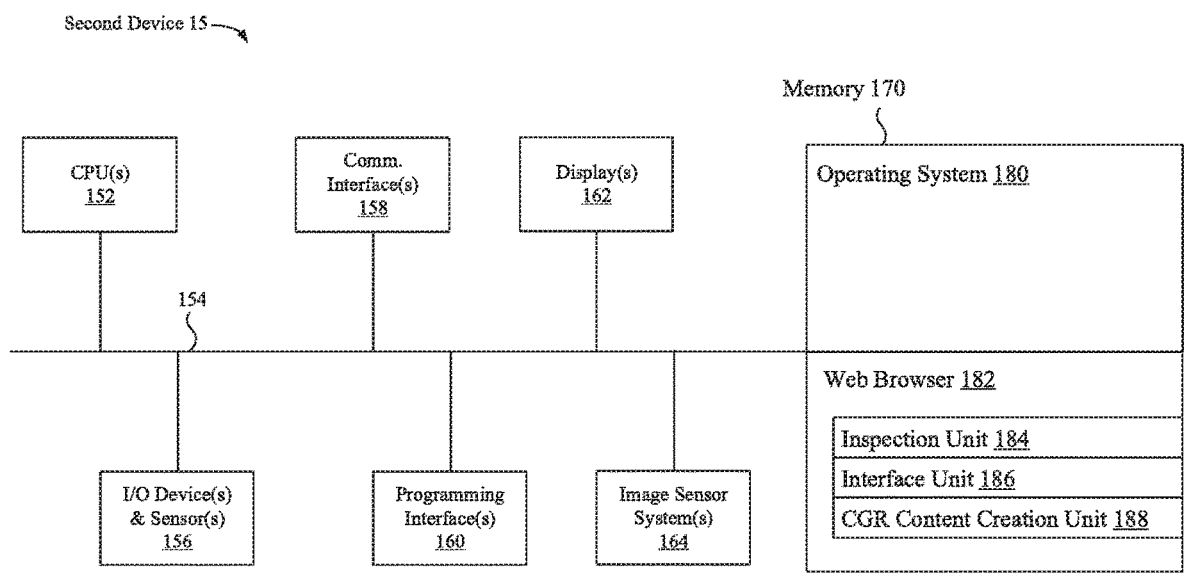
FIG. 6 is a block diagram illustrating device components of an exemplary second device according to some implementations.

FIG. 6 is a block diagram illustrating device components of second device 15 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the second device 15 includes one or more processing units 152 (e.g., microprocessors, ASICs, FPGAs, GPUs, CPUs, processing cores, or the like), one or more input/output (I/O) devices and sensors 156, one or more communication interfaces 158 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 160, one or more displays 162, one or more interior or exterior facing image sensor systems 164, a memory 170, and one or more communication buses 154 for interconnecting these and various other components.

In some implementations, the one or more communication buses 154 include circuitry that interconnects and controls communications between system components. In some implementations, the one or more I/O devices and sensors 156 include at least one of a touch screen, a softkey, a keyboard, a virtual keyboard, a button, a knob, a joystick, a switch, a dial, an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like. In some implementations, movement, rotation, or position of the second device 15 detected by the one or more I/O devices and sensors 156 provides input to the second device 15.

In some implementations, the one or more displays 162 are configured to present a view of a 3D model that is being viewed or editing on another device. In some implementations, the one or more displays 162 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 162 correspond to diffractive, reflective, polarized, holographic, etc. waveguide displays. In one example, the second device 15 includes a single display. In another example, the second device 15 includes a display for each eye. In some implementations, the one or more displays 162 are capable of presenting CGR content.

In some implementations, the one or more image sensor systems 164 are configured to obtain image data that corresponds to at least a portion of a scene local to the second device 15. The one or more image sensor systems 164 can include one or more RGB cameras (e.g., with a complimentary metal-oxide-semiconductor (CMOS) image sensor or a charge-coupled device (CCD) image sensor), monochrome camera, IR camera, event-based camera, or the like. In various implementations, the one or more image sensor systems 164 further include illumination sources that emit light, such as a flash.

The memory 170 includes high-speed random-access memory, such as DRAM, SRAM, DDR RAM, or other random-access solid-state memory devices. In some implementations, the memory 170 includes non-volatile memory, such as one or more magnetic disk storage devices, optical disk storage devices, flash memory devices, or other non-volatile solid-state storage devices. The memory 170 optionally includes one or more storage devices remotely located from the one or more processing units 152. The memory 170 comprises a non-transitory computer readable storage medium. In some implementations, the memory 170 or the non-transitory computer readable storage medium of the memory 170 stores the following programs, modules and data structures, or a subset thereof including an optional operating system 180 and a Web Browser 182. The operating system 180 includes procedures for handling various basic system services and for performing hardware dependent tasks. Furthermore, in some implementations, the functionality of the operating system 180 can alternatively reside in a browser, a browser plugin, or separate from the browser.

In some implementations, the operating system 180 includes a Web Browser 182 for receiving or displaying webpage content. Moreover, an Inspection Unit 184 may be used by Web Browser 182 for inspecting markup language or other webpage content for tags or other indications that 3D content is available. In implementations, the operating system 130 includes an Interface Unit 186 for receiving information from first device 10 such as 3D content or exchanging information regarding receipt or display of 3D content. Furthermore, the operating system 130 may include an CGR Content Creation Unit 188 for generating CGR content or views of an CGR environment using data from multiple sources, e.g., real-world data from a camera and 3D content received from the first device 10. In some implementations, one or more of the Inspection Unit 184, the Interface Unit 186, and the CGR Content Creation Unit 188 are a part of or separate from the Web Browser 182. In some implementations, one or more of the Inspection Unit 184, the Interface Unit 186, and the CGR Content Creation Unit 188 are provided as part of an application separate from the operating system 180 or are implemented on a separate device that is local to or remote from the first device 15.

FIG. 6 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 7:
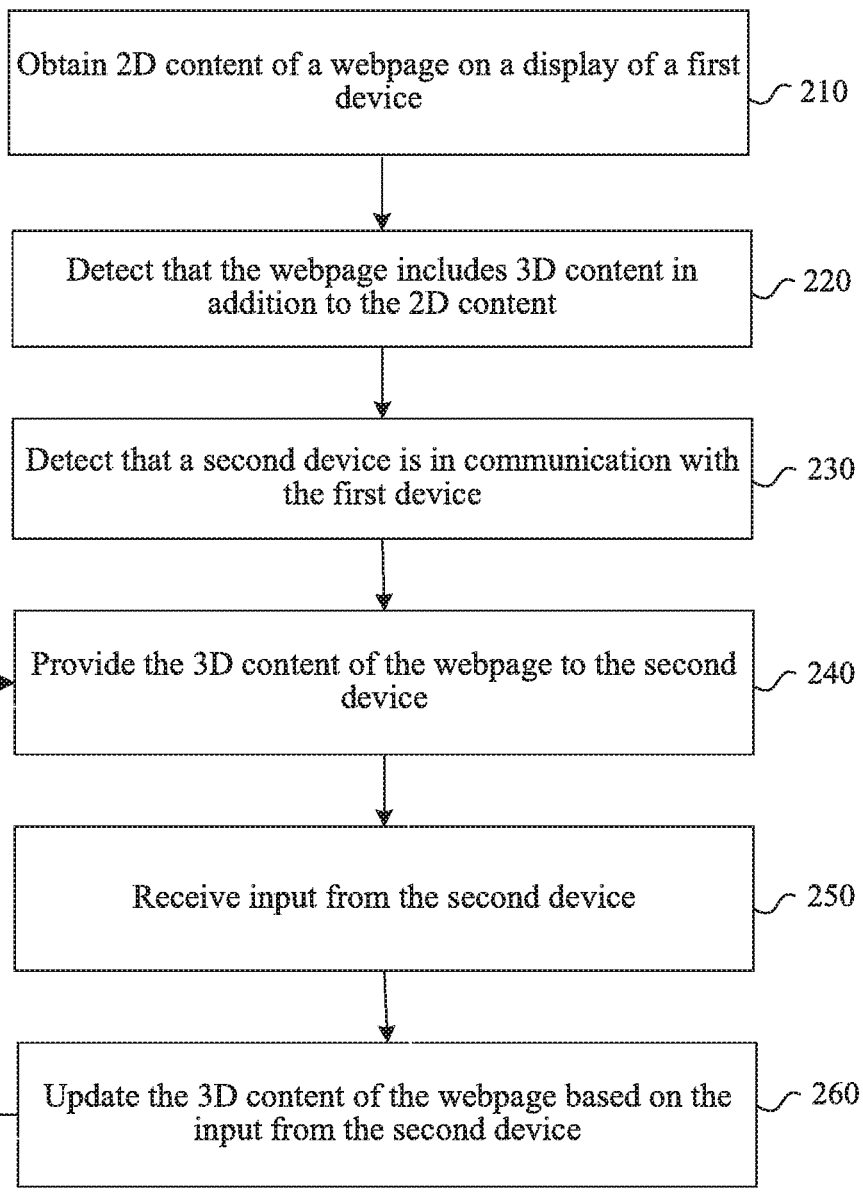
FIG. 7 is a flowchart representation of a method for enabling a first device to obtain 2D content referenced by a webpage and a second device in communication with the first device to display 3D content referenced by the webpage.

FIG. 7 is a flowchart representation of a method 200 for enabling a first device to present 2D content referenced by a webpage and a second device in communication with the first device to display 3D content referenced by the webpage. In some implementations, the method 200 is performed by one or more devices, e.g., first device 10 of FIGS. 1-5. The method 200 can be performed at a mobile device, HMD, desktop, laptop, or server device. In some implementations, the method 200 is performed by processing logic, including hardware, firmware, software, or a combination thereof. In some implementations, the method 200 is performed by a processor executing code stored in a non-transitory computer-readable medium (e.g., a memory).

At block 210, the method 200 obtains 2D content referenced by a webpage for display on a display of a first device. In some implementations, the method 200 interprets HTML tags or JavaScript to display 2D content, such as titles, text, images, etc. For example, the method 200 may process HTML metadata, such as a tag associated with an image element (e.g., "<img>"), to obtain a 2D image embedded in the webpage. In implementations, the 2D content includes a 2D view of an object. In other implementations, the 2D content comprises content that is not formatted for 3D viewing.

At block 220, the method 200 detects that the webpage references 3D content associated with the 2D content. In some implementations, this involves inspecting markup language, e.g., via Mixed Reality Markup Language (MRML) protocol or Application Program Interfaces (APIs), or other aspects of a webpage to identify a markup language statement or any other indicator of 3D content. Accordingly, a markup language file may include one or more statements corresponding to the 3D content or one or more statements that otherwise indicate the availability of 3D content associated with the webpage. A markup-language indicator may be associated with a graphical indicator to be displayed as part of the 2D content referenced by the webpage, for example, in the form of a thumbnail image, link, icon, or button indicating availability of 3D content.

At block 230, the method 200 detects that a second device is in communication with the first device. The communication may be detected based on a link between the first device and the second device. In some implementations, detecting a link between the first device and the second device involves detecting that the second device has been connected to the first device via a USB or other cable. In some implementations, detecting a link between the first device and the second device involves detecting that a wireless communication channel has been established between the devices. In some implementations, a wireless or wired connection or other link between the first device and the second device is automatically detected by the first or second device. In some implementations, this may additionally or alternatively involve recognizing that the connected device is a particular device, type of device, or device associated with a particular user, owner, or account.

If a connection does not exist, a connection may be established. In some implementations, a user of the first device is presented with a message identifying an option to establish a connection. A text, graphical, or audio message is presented, for example, asking whether the user would like to establish a connection. In other implementations, a connection is automatically established based on both the first device and the second device being associated with the same account or user profile. In another example, a connection is automatically established based on detecting that 2D content on one device is associated with 3D content that can be displayed on another device. In another example, a connection is automatically established based on detecting a user intention to share the 3D content one device to another. In another example, a connection is automatically established based on a proximity between the devices, e.g., detecting or estimating that the devices are within a threshold distance of one another. In some implementations, a connection is established via an operating system (OS)-level service call. The connection may also invoke or access a shared memory on the second device. A daemon can map this shared memory into its process space so that it becomes a conduit for the first device to seamlessly link to the second device to provide a 3D content viewing/editing experience.

At block 240, the method 200 provides the 3D content referenced by the webpage to the second device. In some implementations, the first device sends a communication to the second device to automatically launch a 3D viewing interface on the second device.

At block 250, the method 200 receives a communication corresponding to input received at the second device. For example a user of the second device may interact with the second device, e.g., via inputs, hand gestures, selections, etc., and the input at the second device may be subsequently communicated to the first device.

At block 260, the method 200 applies the input received at the second device to the 2D content referenced by the webpage on the display of the first device. In some implementations, the 3D content may additionally, or alternatively, be refreshed, updated, selected, or otherwise modified based on the received input from the second device. The method may then provide, at block 240, the updated 3D content to the second device.

Figure 8:
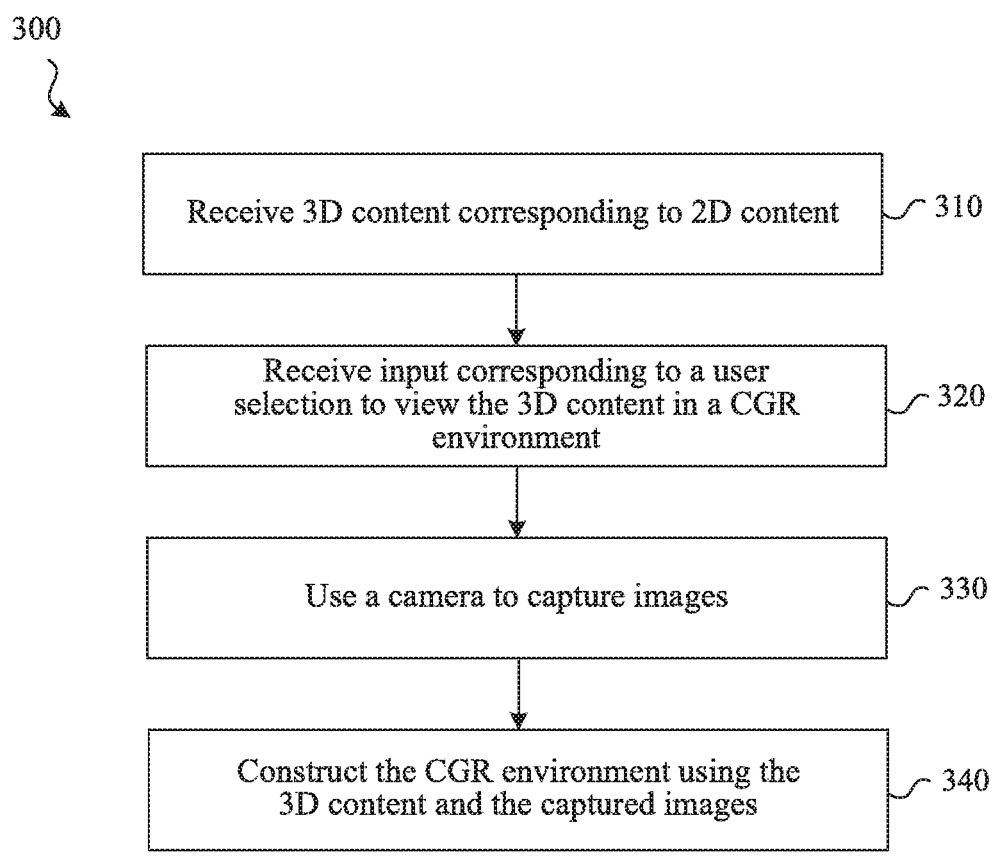
FIG. 8 is a flowchart representation of a method for displaying a CGR environment on a second device with received 3D content from a first device in accordance with some implementations.

FIG. 8 is a flowchart representation of a method 300 for displaying an CGR environment on a second device with received 3D content from a first device in accordance with some implementations. In some implementations, the method 300 is performed by one or more devices (e.g., second device 15 of FIGS. 1-4 and 6). The method 300 can be performed at a mobile device, HMD, desktop, laptop, or server device. The method 300 can be performed on an HMD that has a screen for displaying 3D images or a screen for viewing stereoscopic images. In some implementations, the method 300 is performed by processing logic, including hardware, firmware, software, or a combination thereof. In some implementations, the method 300 is performed by a processor executing code stored in a non-transitory computer-readable medium (e.g., a memory).

At block 310, the method 300 receives 3D content corresponding to 2D content. The 3D content is received from a separate device such as from a device used by another user to send the 3D content or from a webpage server device. In some implementations, the 3D content is received based on user input. For example, the second device may display an indication that 3D content is available via a selectable option and detect a user selection of that option.

At block 320, the method 300 receives input corresponding to a user selection to view the 3D content. In some implementations, the method 300 presents an icon, a graphic, or text representing the 3D content on a user interface and receives input corresponds to a user selection of the icon, the graphic, or the text. In some implementations, a user interface displays an icon, graphic, or text representing such received 3D content and also displays an indicator (text, graphic, etc.) that indicates that a selection of the icon, graphic, or text will launch a viewer for viewing the received 3D content.

Blocks 330 and 340 are performed responsive to detecting the input to view the 3D content. At block 330, the method 300 uses a camera to capture images. The images captured by the camera depict real world content at the scene of the device that can be included in a CGR environment.

At block 340, the method 300 constructs a CGR environment using the 3D content and the captured images. In some implementations, constructing a CGR environment is performed by overlaying the 3D content on the captured images. In some implementations, constructing a CGR environment is performed by detecting one or more planar surfaces in the real world content depicted in the images and positioning the 3D content in a CGR environment based on the detected planar surfaces. For example, at a first instant in time, an image of the received 3D content may be positioned over the most recently captured image of the captured images, at a second instant in time after the capture of an additional captured image, an image (the same or different) of the received 3D content may be positioned over the newly captured image, etc. In some implementations, constructing a CGR environment is performed by constructing a 3D model corresponding to some or all of the real world content depicted in the images and adding the 3D content to the model and then creating an image of the combined content from a particular viewpoint.

The user may interact with and change the CGR environment. In one example, the user changes the position or rotation of the webpage's 3D content. For example, the user may move a depiction of a couch to another location in the scene. In some implementations, the change involves a change of viewpoint. For example, this can involve receiving a movement or rotation of the device and updating the displaying of a CGR environment based on the movement. As the user moves his/her head, moves around the room, jumps up and down, etc., the user's viewpoint changes within the CGR environment. However, the position and rotation of the 3D content relative to real world objects depicted in a CGR environment can remain constant, e.g., the couch remains in its position relative to the floor and other real world objects depicted in the scene. To maintain constant relative positioning, planar surfaces or features are identified in the images and used to maintain the relative position of the received 3D content.

Figure 9:
FIG. 9, in accordance with some implementations, is a flowchart representation of a method for providing a view of a 3D environment at a first device that references 3D content referenced by a webpage, where the 3D content is obtained based on detecting a second device displaying 2D content referenced by the webpage.

FIG. 9, in accordance with some implementations, is a flowchart representation of a method 400 for providing a view of a 3D environment at a first device that includes 3D content referenced by a webpage, where the 3D content is obtained based on detecting a second device displaying 2D content referenced by the webpage. In some implementations, the method 400 is performed by one or more devices (e.g., second device 15 of FIGS. 1-4 and 6). The method 400 can be performed at a mobile device, HMD, desktop, laptop, or server device. The method 400 can be performed on an HMD that has a screen for displaying 3D images or a screen for viewing stereoscopic images. In some implementations, the method 400 is performed by processing logic, including hardware, firmware, software, or a combination thereof. In some implementations, the method 400 is performed by a processor executing code stored in a non-transitory computer-readable medium (e.g., a memory).

At block 410, the method 400 obtains image data representing a physical environment using an image sensor. The image data captured by the image sensor may include real world content, including a second device.

At block 420, the method 400 detects that the second device is depicted in the image data. The method 400 may further detect that the second device displays 2D content referenced by a webpage without 3D content referenced by the webpage. In some implementations, the method 400 detects an icon, a graphic, or text representing the 3D content. In other implementations, the method 400 detects a markup statement in the webpage's defining HTML or other markup language files corresponding to the 3D content.

At block 430, the method 400 obtains the 3D content referenced by the webpage based on detecting that the display of the second device includes 2D content referenced by the webpage without the 3D content referenced by the webpage. In some implementations, the 3D content is obtained from the second device that is displaying the 2D content. In some implementations, the 3D content is obtained from a web address associated with the webpage displayed on the second device.

At block 440 of the method 400, the first device provides a view of a 3D environment that includes the 3D content referenced by the webpage for display. The method 400 may construct a view of the 3D environment using the 3D content and the image data. In some implementations, the view of a 3D environment is constructed using live or pre-recorded image data. In some implementations, constructing the view of the 3D environment is performed by overlaying the 3D content on the image data. In some implementations, constructing the view of the 3D environment is performed by constructing a 3D model corresponding to some or all of the real world content depicted in the image data, adding the 3D content to the model, and then creating an image of the combined content from a particular viewpoint.

At block 450 of the method 400, the first device receives input from a user (e.g., inputs, hand gestures, selections, etc.). At block 460 of the method 400, the first device communicates the received input to the second device so that the second device can apply the input to webpage content displayed at the second device. In some implementations, the 3D content may additionally, or alternatively, be refreshed, updated, selected, or otherwise modified based on the input. The first device may receive a response to the input from the second device, e.g., a notification that the input was received or applied and, as at block 430, the first device may iteratively obtain 3D content referenced by the webpage from the second device.

Figure 10:
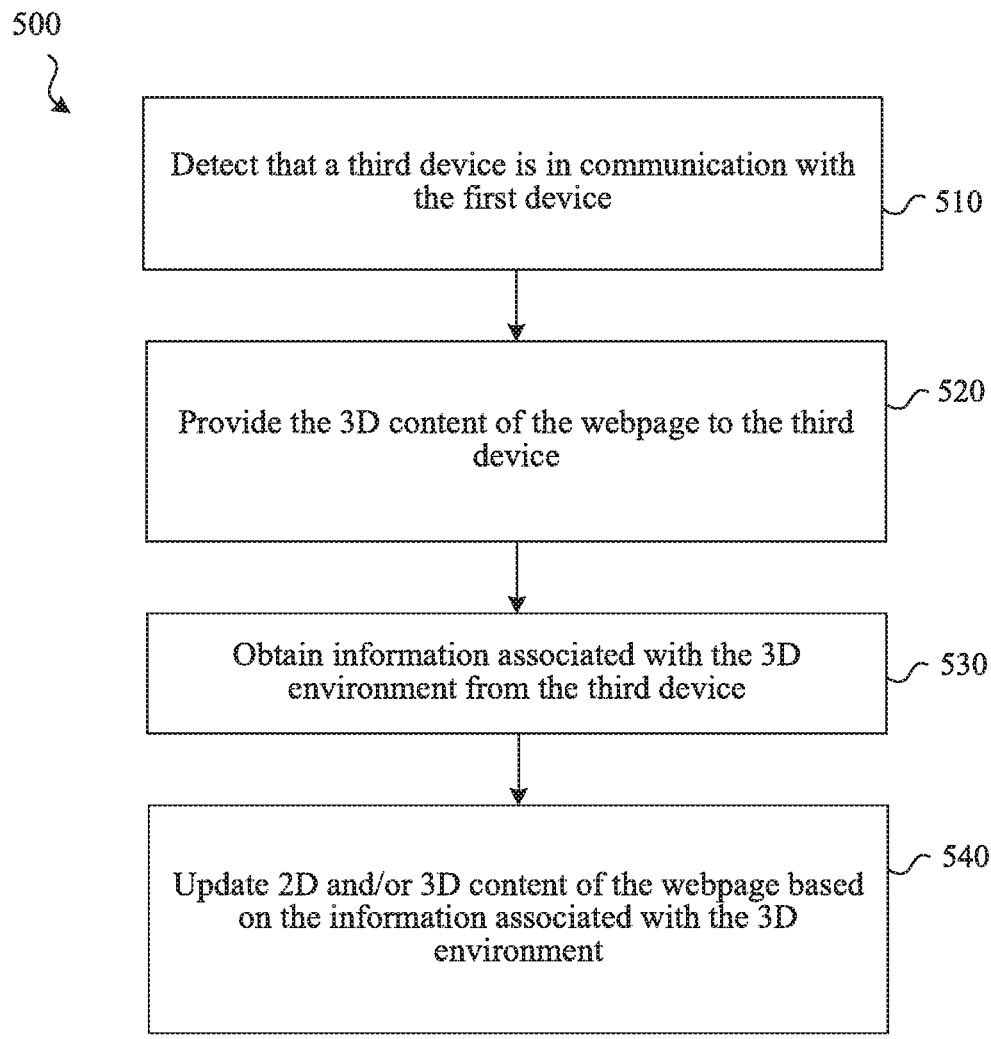
FIG. 10 is a flowchart representation of a method for enabling a first device to update 2D content or 3D content based on information associated with the current state of the 3D environment in accordance with some implementations.

FIG. 10 is a flowchart representation of a method 500 for enabling a first device to update 2D content or 3D content based on information associated with the current state of a 3D environment. In some implementations, the method 500 is performed by three or more devices, e.g., first device 10 and second device 15 of FIGS. 1-5, as well as a third device. The method 500 can be performed at a mobile device, HMD, desktop, laptop, or server device. In some implementations, the method 500 is performed by processing logic, including hardware, firmware, software, or a combination thereof. In some implementations, the method 500 is performed by a processor executing code stored in a non-transitory computer-readable medium (e.g., a memory).

At block 510, the method 500 provides the 3D content referenced by the webpage to a second device and a third device. In some implementations, the first device sends a communication to the second device or the third device to automatically launch a 3D viewing interface. In some implementations, the third device does not include a viewing interface, e.g., a web-enabled camera.

At block 520, the method 500 grants the third device with modify privileges. In some implementations, the third device may launch the 3D viewing interface in a read-only mode, i.e., the third device may only be permitted to view the 3D content or comment on the 3D content using text messages or emojis, but the third device may not be permitted to modify the 3D content or the state of the 3D environment. The first device or the second device, via a respective user interface, may subsequently grant the third device with modify privileges. Accordingly, at block 520, the method 500 grants the third device with modify privileges.

At block 530, the method 500 obtains information associated with a current state of the 3D environment from the third device. In some implementations, information associated with the 3D environment includes images captured by an onboard camera of the third device depicting real world content at the scene of the third device that can be included in or otherwise used to create a CGR environment.

At block 540, the method 500 updates the 2D content or the 3D content referenced by the webpage based on the information associated with the current state of the 3D environment, e.g., images or models of the real world environment. In some implementations, the 2D or 3D content is refreshed, updated, selected, or otherwise modified based on the received information from the third device. In some implementations, the first device provides a view of webpage content that includes, incorporates, or uses the information associated with the current state of the 3D environment. In an example, the first device is a laptop computer without an onboard camera and the connected third device is a mobile phone with an onboard camera. The mobile phone provides the laptop with images of the 3D environment, which the laptop uses to provide a view of webpage content that incorporates the 3D environment. In another example the first device is a desktop computer and the third device is a web-enabled camera. The camera provides the desktop computer with images of the 3D environment. The desktop computer includes the images received from the camera in the background of the 2D content referenced by the webpage that it is displaying.

At block 550, the method 500 shares the updated content referenced by the webpage with the second device or the third device. For example, the 3D environment information received at the first device from the third device can be used to update webpage content that is then distributed for viewing on the second device. In one example, the first device is a laptop, the second is a mobile phone, and the third device is a HMD. In this example, the HMD captures an image of the 3D environment around it and shares those images for inclusion into the webpage experience on the first device, the second device, or both.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A non-transitory computer-readable storage medium storing program instructions that are computer-executable to perform operations comprising:

obtaining two-dimensional (2D) content referenced by a content item for display via an application on a display of a first device;

detecting that the content item references three-dimensional (3D) content associated with the 2D content;

detecting that a second device is in communication with the first device and capable of displaying the 3D content referenced by the content item, wherein detecting that the second device is capable of displaying the 3D content is based on detecting a type of the second device or detecting an application on the second device capable of displaying the 3D content; and identifying the 3D content referenced by the content item to the second device.

2. The non-transitory computer-readable storage medium of claim 1, wherein the content item is a webpage and detecting that the webpage references the 3D content comprises identifying a markup language statement in the webpage corresponding the 3D content.

3. The non-transitory computer-readable storage medium of claim 1, wherein the 3D content is a virtual object having stereoscopic display information.

4. The non-transitory computer-readable storage medium of claim 1, wherein the operations further comprise:
displaying an affordance indicating availability of the 3D content responsive to detecting that the second device is in communication with the first device.

5. The non-transitory computer-readable storage medium of claim 1, wherein detecting that the second device is capable of displaying the 3D content referenced by the content item is based on:
detecting the type of the second device.

6. A non-transitory computer-readable storage medium storing program instructions that are computer-executable to perform operations comprising:
obtaining two-dimensional (2D) content referenced by a content item for display via an application on a display of a first device;
detecting that the content item references three-dimensional (3D) content associated with the 2D content;
detecting that a second device is in communication with the first device capable of displaying the 3D content referenced by the content item, wherein detecting that the second device is in communication with the first device comprises:
detecting that the first device and the second device are both associated with a same account;
detecting that the second device is within a threshold proximity of the first device; or
detecting that the first device is within a field of view of a camera of the second device; and
identifying the 3D content referenced by the content item to the second device.

7. A non-transitory computer-readable storage medium storing program instructions that are computer-executable to perform operations comprising:
obtaining two-dimensional (2D) content referenced by a content item for display via an application on a display of a first device;
detecting that the content item references three-dimensional (3D) content associated with the 2D content;
detecting that a second device is in communication with the first device capable of displaying the 3D content referenced by the content item; and
identifying the 3D content referenced by the content item to the second device;
determining a first spatial relationship between the first device and the second device; and
displaying the 3D content on the display of the detected second device based on the first spatial relationship.

8. The non-transitory computer-readable storage medium of claim 7, wherein the operations further comprise:
identifying a change in location of the first device relative to the second device;
determining a second spatial relationship between the first device and the second device; and updating the 3D content on the display of the detected second device based on the second spatial relationship.

9. A non-transitory computer-readable storage medium storing program instructions that are computer-executable to perform operations comprising:
obtaining two-dimensional (2D) content referenced by a content item for display via an application on a display of a first device;
detecting that the content item references three-dimensional (3D) content associated with the 2D content;
detecting that a second device is in communication with the first device capable of displaying the 3D content referenced by the content item; and
identifying the 3D content referenced by the content item to the second device; and
sharing data associated with a change to the 2D content on the display of the first device; and
wherein identifying the 3D content referenced by the content item to the detected second device is based on the change to the 2D content.

10. A method comprising:
at a first device comprising a processor, a computer-readable storage medium, an image sensor, and a display:
obtaining image data representing a physical environment using the image sensor;
detecting that a second device is depicted in the image data, wherein the second device displays two-dimensional (2D) content referenced by a content item without three-dimensional (3D) content referenced by the content item;
based on the detecting, obtaining the 3D content referenced by the content item; and
providing a view of a 3D environment that includes the 3D content referenced by the content item for display on the display.

11. The method of claim 10, wherein the content item is a webpage.

12. The method of claim 10 further comprising detecting, in the image data, a 3D content indicator displayed as part of the content item displayed by an application on the first device.

13. The method of claim 12 further comprising, based on detecting the 3D content indicator:
determining to obtain the 3D content from the first device; or
providing a user interface option to display the 3D content via the first device.

14. The method of claim 10, further comprising detecting that the second device is in communication with the first device.

15. The method of claim 10, wherein the 3D content is obtained from the first device.

16. The method of claim 10, wherein the view of the 3D environment includes:
a depiction of the second device displaying the 2D content referenced by the content item; and
the 3D content referenced by the content item adjacent to the depiction of the second device.

17. The method of claim 16, wherein an association indicator in the view of the 3D environment indicates an association between the 3D content referenced by the content item and the depiction of the second device displaying the 2D content referenced by the content item.

18. A system comprising:
an electronic device with a display and an image sensor;
a processor; and a computer-readable storage medium comprising instructions that upon execution by the processor cause the system to perform operations, the operations comprising:

obtaining two-dimensional (2D) content referenced by a webpage for display on a display of a first device;

detecting that the webpage references three-dimensional (3D) content associated with the 2D content;

detecting that a second device is in communication with the first device, wherein the second device is capable of displaying the 3D content referenced by the webpage; and identifying the 3D content referenced by the webpage to the second device.

19. The system of claim 18, wherein the 3D content is a virtual object having stereoscopic display information.

20. The system of claim 18, wherein the operations further comprise:

detecting that the second device is in communication with the first device; and displaying an affordance indicating availability of the 3D content responsive to detecting that the second device is in communication with the first device.

* * * * *